US012632399B2

(12) United States Patent
Magro et al.

(10) Patent No.: US 12,632,399 B2
(45) Date of Patent: *May 19, 2026

(54) MEMORY CONTROLLER WITH A PLURALITY OF COMMAND SUB-QUEUES AND CORRESPONDING ARBITERS

(71) Applicant: ADVANCED MICRO DEVICES, INC., Santa Clara, CA (US)

(72) Inventors: James R. Magro, Austin, TX (US); Kedarnath Balakrishnan, Bangalore (IN); Brendan T. Mangan, Boxborough, MA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/772,708

(22) Filed: Jul. 15, 2024

(65) Prior Publication Data
US 2024/0370387 A1 Nov. 7, 2024

Related U.S. Application Data

(63) Continuation of application No. 17/961,613, filed on Oct. 7, 2022, now Pat. No. 12,038,856, which is a continuation of application No. 17/085,304, filed on Oct. 30, 2020, now Pat. No. 11,494,316.

(60) Provisional application No. 63/069,352, filed on Aug. 24, 2020.

(51) Int. Cl.
*G06F 13/16* (2006.01)
*G06F 9/30* (2018.01)
(Continued)

(52) U.S. Cl.
CPC ...... *G06F 13/1668* (2013.01); *G06F 9/30043* (2013.01); *G06F 12/0246* (2013.01); *G06F 12/1009* (2013.01); *G06F 13/1605* (2013.01)

(58) Field of Classification Search
CPC ............. G06F 13/1668; G06F 9/30043; G06F 12/0246; G06F 12/1009; G06F 13/1605;
(Continued)

(56) References Cited

U.S. PATENT DOCUMENTS

| | | |
|---|---|---|
| 5,903,776 A | 5/1999 | Larson |
| 6,938,133 B2 | 8/2005 | Johnson et al. |

(Continued)

FOREIGN PATENT DOCUMENTS

| | | |
|---|---|---|
| EP | 3270294 A1 | 1/2018 |
| JP | 2021507414 A | 2/2021 |
| WO | 2019125563 A1 | 6/2019 |

OTHER PUBLICATIONS

International Search Report and Written Opinion, PCT/US2021/047274, Jan. 3, 2022, 8 pages.
(Continued)

*Primary Examiner* — Idriss N Alrobaye
*Assistant Examiner* — Richard B Franklin

(57) ABSTRACT

A memory controller includes a memory channel controller that uses multiple groups of command queue and arbiter pairs. Each arbiter is coupled to a respective command queue to select memory access commands from each command queue according to predetermined criteria. Each arbiter selects from among the memory access requests in each command queue independently based on the predetermined criteria and sends selected memory access requests to a selector that serves as a second level arbiter which sends the request to a memory subchannel.

20 Claims, 10 Drawing Sheets

(51) Int. Cl.
   *G06F 12/02*       (2006.01)
   *G06F 12/1009*     (2016.01)

(58) Field of Classification Search
   CPC ...... G06F 13/36; G06F 13/366; G06F 13/362;
   G06F 13/1626; G06F 13/1642; G06F
   13/1615
   See application file for complete search history.

(56)                  References Cited

U.S. PATENT DOCUMENTS

| | | |
|---|---|---|
| 7,366,854 B2 | 4/2008 | Wastlick et al. |
| 8,775,720 B1 | 7/2014 | Meyer et al. |
| 9,092,305 B1 * | 7/2015 | Blott ......................... G06F 3/06 |
| 9,785,579 B2 | 10/2017 | Toyoda et al. |
| 10,037,150 B2 | 7/2018 | Magro et al. |
| 10,649,922 B2 | 5/2020 | Fukami et al. |
| 10,949,121 B2 | 3/2021 | Takano |
| 11,042,300 B2 * | 6/2021 | Olcay ..................... G06F 3/061 |
| 2016/0313946 A1 | 10/2016 | Zang et al. |
| 2018/0018105 A1 | 1/2018 | Magro et al. |
| 2018/0074704 A1 | 3/2018 | Teh |
| 2019/0196721 A1 | 6/2019 | Magro |
| 2020/0026466 A1 | 1/2020 | Takano |

OTHER PUBLICATIONS

ACRi, Using MIG to Run DRAM Memory (2), https://www.acri.
c.titech.ac.jp/wordpress/archives/6767, Tokyo Institute of Technol-
ogy Thiem Van Chu, dated Jul. 30, 2020, 6 pages.

* cited by examiner

TO/FROM SMU 280

SMN

POWER ENGINE

APB

320

TO/FROM DATA FABRIC 250

SDP

312

310

MEMORY CHANNEL CONTROLLER

314

316

DFI

DDRx PHY

330

TO/FROM MEMORY CHANNEL

300

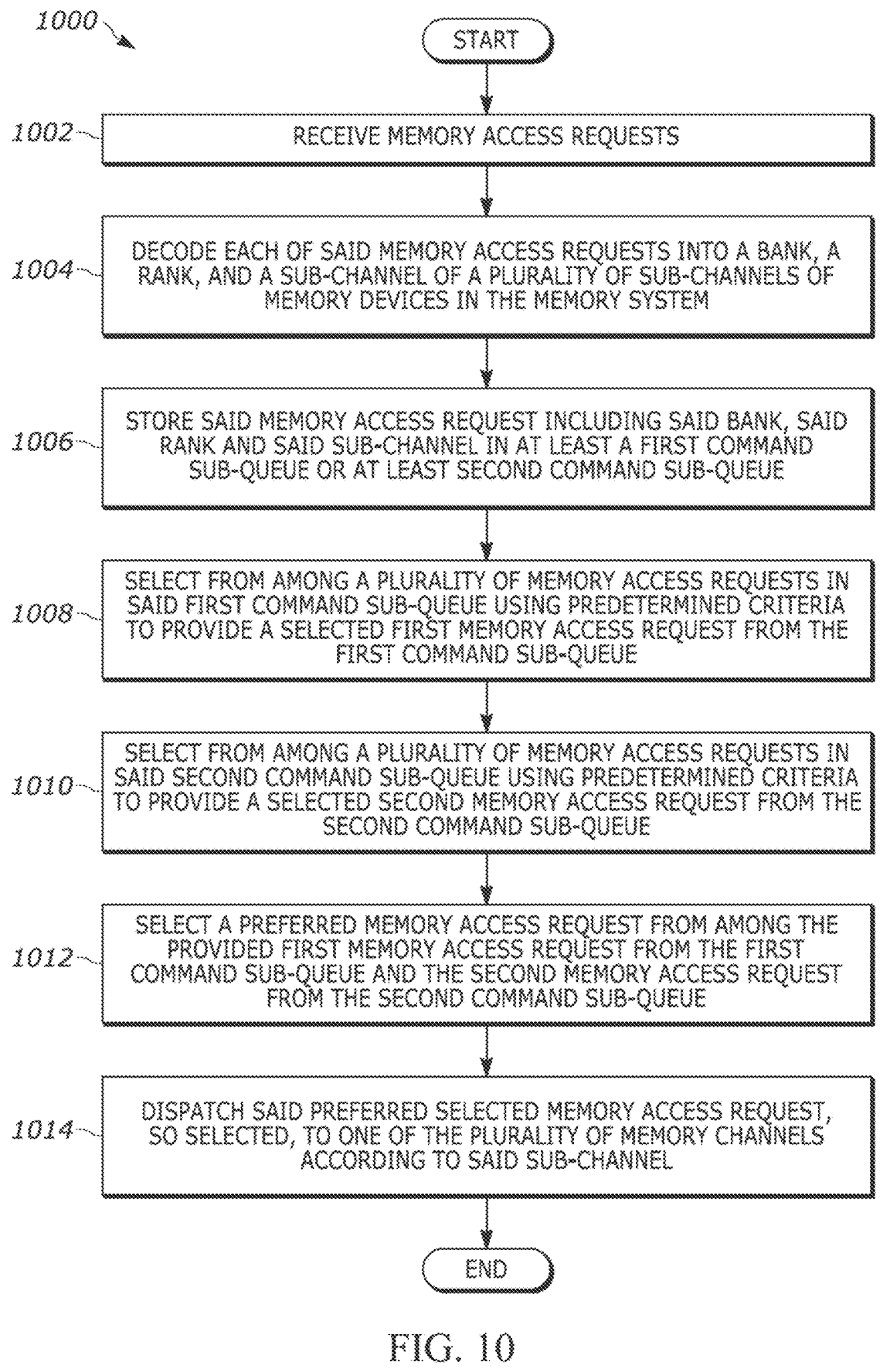

1000

START

1002 — RECEIVE MEMORY ACCESS REQUESTS

1004 — DECODE EACH OF SAID MEMORY ACCESS REQUESTS INTO A BANK, A RANK, AND A SUB-CHANNEL OF A PLURALITY OF SUB-CHANNELS OF MEMORY DEVICES IN THE MEMORY SYSTEM

1006 — STORE SAID MEMORY ACCESS REQUEST INCLUDING SAID BANK, SAID RANK AND SAID SUB-CHANNEL IN AT LEAST A FIRST COMMAND SUB-QUEUE OR AT LEAST SECOND COMMAND SUB-QUEUE

1008 — SELECT FROM AMONG A PLURALITY OF MEMORY ACCESS REQUESTS IN SAID FIRST COMMAND SUB-QUEUE USING PREDETERMINED CRITERIA TO PROVIDE A SELECTED FIRST MEMORY ACCESS REQUEST FROM THE FIRST COMMAND SUB-QUEUE

1010 — SELECT FROM AMONG A PLURALITY OF MEMORY ACCESS REQUESTS IN SAID SECOND COMMAND SUB-QUEUE USING PREDETERMINED CRITERIA TO PROVIDE A SELECTED SECOND MEMORY ACCESS REQUEST FROM THE SECOND COMMAND SUB-QUEUE

1012 — SELECT A PREFERRED MEMORY ACCESS REQUEST FROM AMONG THE PROVIDED FIRST MEMORY ACCESS REQUEST FROM THE FIRST COMMAND SUB-QUEUE AND THE SECOND MEMORY ACCESS REQUEST FROM THE SECOND COMMAND SUB-QUEUE

1014 — DISPATCH SAID PREFERRED SELECTED MEMORY ACCESS REQUEST, SO SELECTED, TO ONE OF THE PLURALITY OF MEMORY CHANNELS ACCORDING TO SAID SUB-CHANNEL

END

FIG. 10

MEMORY CONTROLLER WITH A PLURALITY OF COMMAND SUB-QUEUES AND CORRESPONDING ARBITERS

CROSS-REFERENCE TO RELATED APPLICATIONS

This application is a continuation application for patent entitled to a filing date and claiming the benefit of earlier-filed U.S. patent application Ser. No. 17/961,613, filed Oct. 7, 2022, which is a continuation and claims priority to U.S. Pat. No. 11,494,316, issued Nov. 8, 2022, which claims priority to U.S. Provisional Patent Application No. 63/069,352, filed Aug. 24, 2020. Each patent application cited herewith is hereby incorporated by reference in its entirety.

BACKGROUND OF THE DISCLOSURE

Computer systems typically use inexpensive and high-density dynamic random access memory (DRAM) chips for main memory. Most DRAM chips sold today are compatible with various double data rate (DDR) DRAM standards promulgated by the Joint Electron Devices Engineering Council (JEDEC). DDR DRAMs offer both high performance and low power operation by providing various low power modes.

Modern DDR memory controllers maintain queues to store pending memory access requests to allow them to pick the pending memory access requests out of order in relation to the order in which they were generated or stored to increase efficiency. For example, the memory controllers can retrieve multiple memory access requests to the same row in a given rank of memory from the queue and issue them consecutively to the memory system, based on checking page hits, to avoid the overhead of pre-charging the current row and activating another row. Some DDR memory controllers employ a single command queue, such as a 64 entry command queue and arbiter that arbitrates among all of the 64 command queue entries each containing a memory access request. Data processing systems employing high density dynamic random access memories such as cloud computing servers, desktop computers, laptop computers, mobile devices, printers and other devices require higher performance capabilities than ever before.

BRIEF DESCRIPTION OF THE DRAWINGS

The implementations will be more readily understood in view of the following description when accompanied by the below figures, wherein like reference numerals represent like elements, and wherein:

FIG. 10 is a flowchart illustrating one example of a method for controlling a memory system having a plurality of memory channels according to some embodiments.

Figure 1:
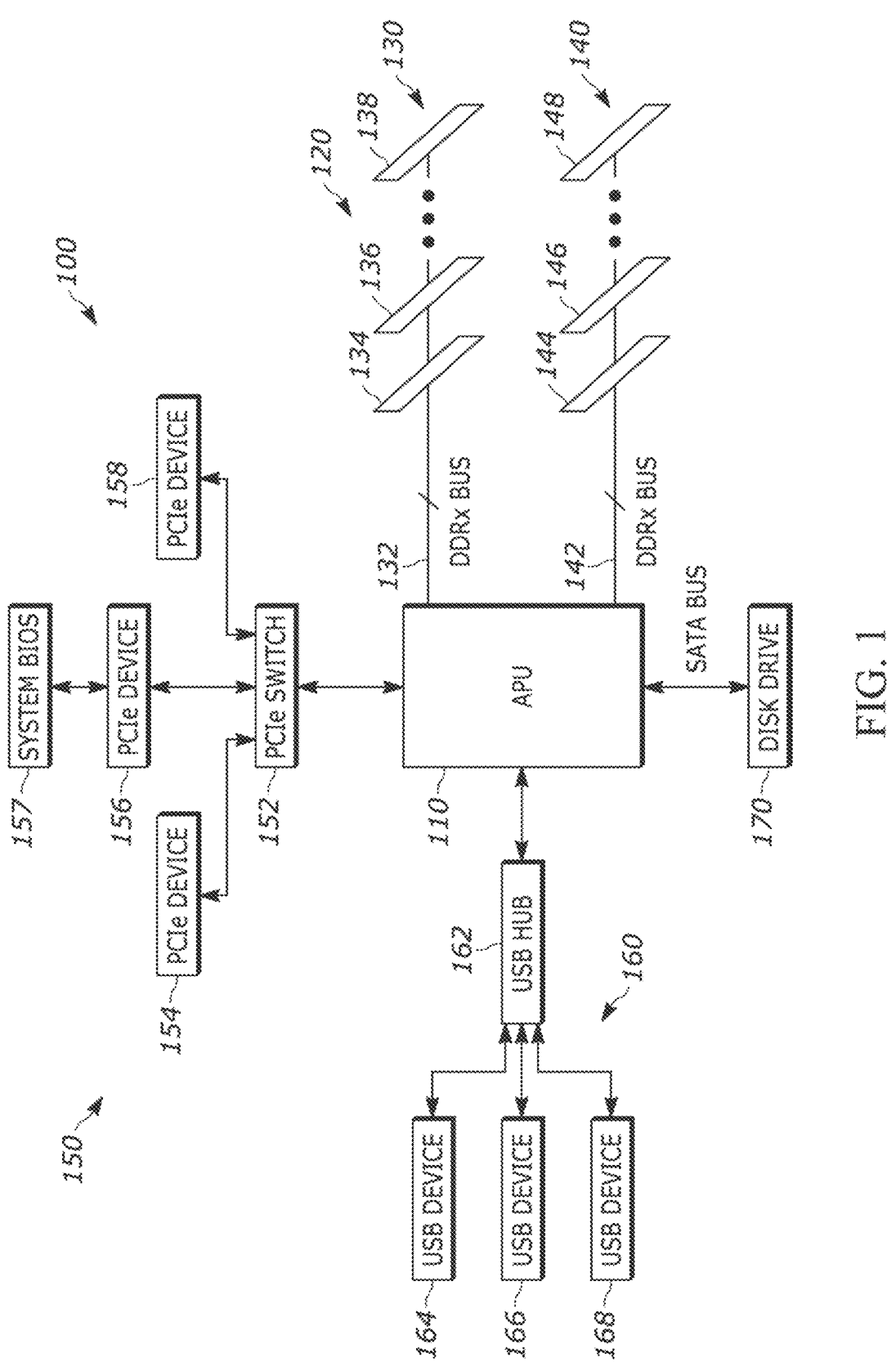
FIG. 1 illustrates in block diagram of a data processing system according to some embodiments.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION OF IMPLEMENTATIONS

It has been found that the arbiter in conventional DDR memory controllers can take too much time to evaluate all 64 entries regarding priority, JEDEC timing dependency and page state information. Timing can be difficult causing delays in processing memory read and write commands (also referred to herein as read accesses, read requests, write accesses and write requests). As will be described below, in some implementations, a memory controller includes a memory channel controller that uses multiple groups of command queue and arbiter pairs such that more but smaller command queues are employed. A plurality of command sub-queues are used as the command queue for a channel or sub-channel. In some implementations, each arbiter is coupled to a respective command queue to select memory access commands from each command queue according to predetermined criteria, such as DDR timing criteria and other criteria. The arbiter selects from among the memory access requests in each command queue independently based on the predetermined criteria and sends selected memory access requests to a selector that serves as a second level arbiter which sends the request to a subchannel. In certain implementations, using multiple smaller command queues and corresponding dedicated arbiters instead of a single larger command queue and arbiter increases the speed of operation of the memory controller and corresponding data processing system.

According to certain implementations, a method for controlling a memory system having a plurality of memory channels, includes receiving memory access requests. The method includes decoding each of the memory access requests. The method also includes storing the decoded memory access request in at least a first command sub-queue or at least a second command sub-queue. The method also includes selecting from among a plurality of memory access requests in the first command sub-queue using predetermined criteria to provide a selected first memory access request from the first command sub-queue. The method also includes selecting from among a plurality of memory access requests in the second command sub-queue using predetermined criteria to provide a selected second memory access request from the second command sub-queue. The method also includes selecting a preferred memory access request from among the provided first memory access request from the first command sub-queue and the second memory access request from the second command sub-queue. The method also includes dispatching the preferred selected memory access request, so selected, to one of the plurality of memory channels according to the sub-channel.

In some examples, the method includes sorting memory access requests into differing command sub-queues such that the first command sub-queue includes only read requests and the second command sub-queue includes only write requests. In certain examples, the method includes decoding the memory access requests into a bank, a rank, and a sub-channel of a plurality of sub-channels of memory devices in the memory system and storing the bank, rank, and sub-channel in one of the plurality of command sub-queues. In some implementations, the method includes selecting the preferred memory access request by selecting an oldest memory access request from among the provided first memory access request from the first command sub-queue and the second memory access request from the second command sub-queue.

In certain implementations, a memory controller includes a memory channel controller, the memory channel controller includes at least a first command sub-queue configured to store memory access requests and a corresponding first arbiter coupled to the first command sub-queue to select memory access commands from the first command sub-queue according to predetermined criteria. The memory also includes at least a second command sub-queue configured to store memory access requests and a corresponding second arbiter coupled to the second command sub-queue to select memory access commands from the second command sub-queue according to predetermined criteria. The memory also includes command queue entry logic, that places memory access requests into the first command sub-queue and the second command sub-queue. The memory also includes a first selector coupled to both the first and second arbiters operative to select memory requests from either of the first command sub-queue or the second command sub-queue and send selected memory access requests to at least one of a plurality of sub-channels.

In some examples, the command queue entry logic sorts memory access requests into differing command sub-queues such that the first command sub-queue includes only read requests and the second command sub-queue includes only write requests. In other implementations, the command queue entry logic transfers entries from the first command sub-queue to the second command sub-queue.

In certain examples, the memory controller includes shared timing logic and a shared page table that is shared between the first arbiter and the second arbiter.

In some examples, the memory control logic includes at least a third command sub-queue for storing memory access requests and a corresponding third arbiter coupled to the third command sub-queue to select memory access commands from the third command sub-queue according to predetermined criteria. The memory also includes at least a fourth command sub-queue for storing memory access requests and a corresponding fourth arbiter coupled to the fourth command sub-queue to select memory access commands from the fourth command sub-queue according to predetermined criteria. The memory also includes a second selector coupled to both the third and fourth arbiters operative to select memory requests from either of the third command sub-queue or the fourth command sub-queue. The memory also includes a third selector operatively coupled to the first and second selectors and operative to select memory requests from either of the first selector or the second selector and send selected memory access requests to at least one of a plurality of sub-channels.

In certain examples, the memory controller includes command queue entry logic, operatively coupled to the first command sub-queue, the second command sub-queue, the third command sub-queue and the fourth command sub-queue, and operative to sort memory access requests into differing command queues such that the first command sub-queue and second command queue includes only read requests and the third command sub-queue and the fourth command queue includes only write requests.

In some examples, the memory control logic includes at least a third command sub-queue for storing memory access requests and a corresponding third arbiter coupled to the third command sub-queue to select memory access commands from the third command sub-queue according to predetermined criteria. The memory control logic also includes at least a fourth command sub-queue for storing memory access requests and a corresponding fourth arbiter coupled to the fourth command sub-queue to select memory access commands from the fourth command sub-queue according to predetermined criteria. The memory control logic also includes a second selector coupled to both the third and fourth arbiters operative to select memory requests from either of the third command sub-queue or the fourth command sub-queue and send selected memory access requests to a corresponding sub-channel.

In certain implementations, a data processing system includes a plurality of memory accessing agents for providing memory access requests. The data processing system also includes a plurality of memory channels. The data processing system also includes a memory controller coupled to the plurality of memory accessing agents and to the plurality of memory channels and having a memory channel controller, the memory channel controller including at least a first command sub-queue for storing memory access requests and a corresponding first arbiter coupled to the first command sub-queue to select memory access commands from the first command sub-queue according to predetermined criteria. The memory channel controller also includes at least a second command sub-queue for storing memory access requests and a corresponding second arbiter coupled to the second command sub-queue to select memory access commands from the second command sub-queue according to predetermined criteria. The memory channel controller also includes command queue entry logic, operatively coupled to the first command sub-queue and to the second command sub-queue, and operative to place memory access requests into the first command sub-queue and the second command sub-queue. The memory channel controller also includes a first selector coupled to both the first and second arbiters that selects memory requests from either of the first command sub-queue or the second command sub-queue and sends selected memory access requests to at least one of a plurality of sub-channels.

In some examples, the command queue entry logic sorts memory access requests into differing command sub-queues such that the first command sub-queue includes only read requests and the second command sub-queue includes only write requests. In some implementations, the command queue entry logic transfer entries from the first command sub-queue to the second command sub-queue.

In certain examples, the data processing system includes shared timing logic and a shared page table that is shared between the first arbiter and the second arbiter.

In some examples, the data processing system includes at least a third command sub-queue for storing memory access requests and a corresponding third arbiter coupled to the third command sub-queue to select memory access commands from the third command sub-queue according to predetermined criteria. The data processing system also includes at least a fourth command sub-queue for storing memory access requests and a corresponding fourth arbiter coupled to the fourth command sub-queue to select memory access commands from the fourth command sub-queue according to predetermined criteria. The data processing system also includes a second selector coupled to both the third and fourth arbiters operative to select memory requests from either of the third command sub-queue or the fourth command sub-queue. The data processing system also includes a third selector operatively coupled to the first and second selectors and operative to select memory requests from either of the first selector or the second selector and send selected memory access requests to at least one of a plurality of sub-channels.

In certain examples, the memory controller includes command queue entry logic, operatively coupled to the first command sub-queue, the second command sub-queue, the third command sub-queue and the fourth command sub-queue, that sorts memory access requests into differing command queues such that the first command sub-queue and second command queue includes only read requests and the third command sub-queue and the fourth command queue includes only write requests.

In some examples, the data processing system includes at least a third command sub-queue for storing memory access requests and a corresponding third arbiter coupled to the third command sub-queue to select memory access commands from the third command sub-queue according to predetermined criteria. The data processing system also includes at least a fourth command sub-queue for storing memory access requests and a corresponding fourth arbiter coupled to the fourth command sub-queue to select memory access commands from the fourth command sub-queue according to predetermined criteria. The data processing system also includes a second selector coupled to both the third and fourth arbiters operative to select memory requests from either of the third command sub-queue or the fourth command sub-queue and send selected memory access requests to a corresponding sub-channel.

FIG. 1 illustrates a non-limiting example block diagram illustrating a data processing system 100 according to some embodiments. Data processing system 100 includes generally a data processor 110 in the form of an accelerated processing unit (APU), a memory system 120, a peripheral component interconnect express (PCIe) system 150, a universal serial bus (USB) system 160, and a disk drive 170. Data processor 110 operates as the central processing unit (CPU) of data processing system 100 and provides various buses and interfaces useful in modern computer systems. These interfaces include two double data rate (DDRx) memory channels, a PCIe root complex for connection to a PCIe link, a USB controller for connection to a USB network, and an interface to a Serial Advanced Technology Attachment (SATA) mass storage device.

Memory system 120 includes a memory channel 130 and a memory channel 140. Memory channel 130 includes a set of dual inline memory modules (DIMMs) connected to a DDRx bus 132, including representative DIMMs 134, 136, and 138 that in this example correspond to separate ranks. Likewise memory channel 140 includes a set of DIMMs connected to a DDRx bus 142, including representative DIMMs 144, 146, and 148. A DDR5 dual in-line memory module (DIMM), for example, has two independent 32-bit channels referred to as "sub-channels". From a DRAM controller architecture usage perspective a single controller runs two separate 32-bit channels independently and in this case from a controller perspective two channels is also referred to as a sub-channel as well.

PCIe system 150 includes a PCIe switch 152 connected to the PCIe root complex in data processor 110, a PCIe device 154, a PCIe device 156, and a PCIe device 158. PCIe device 156 in turn is connected to a system basic input/output system (BIOS) memory 157. System BIOS memory 157 can be any of a variety of non-volatile memory types, such as read-only memory (ROM), flash electrically erasable programmable ROM (EEPROM), and the like.

USB system 160 includes a USB hub 162 connected to a USB master in data processor 110, and representative USB devices 164, 166, and 168 each connected to USB hub 162. USB devices 164, 166, and 168 could be devices such as a keyboard, a mouse, a flash EEPROM port, and the like.

Disk drive 170 is connected to data processor 110 over a SATA bus and provides mass storage for the operating system, application programs, application files, and the like.

Data processing system 100 is suitable for use in modern computing applications by providing a memory channel 130 and a memory channel 140. Each of memory channels 130 and 140 can connect to state-of-the-art DDR memories such as DDR version four (DDR4), low power DDR4 (LPDDR4), graphics DDR version five (gDDR5), and high bandwidth memory (HBM), and can be adapted for future memory technologies. These memories provide high bus bandwidth and high speed operation. At the same time, they also provide low power modes to save power for battery-powered applications such as laptop computers, and also provide built-in thermal monitoring.

Figure 2:
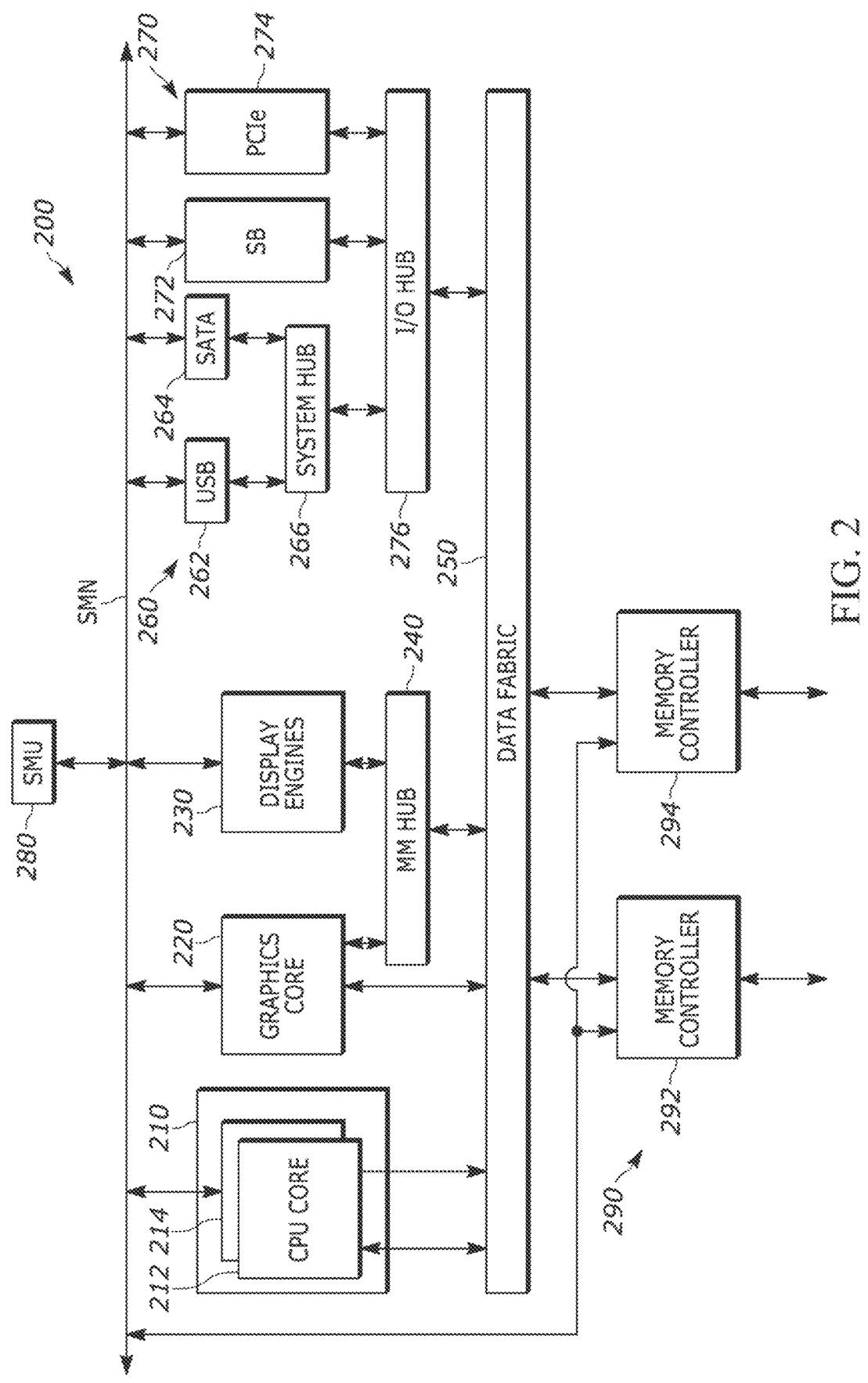
FIG. 2 illustrates in block diagram of an accelerated processing unit (APU) suitable for use in the data processing system of FIG. 1.

FIG. 2 illustrates in block diagram form an APU 200 suitable for use in data processing system 100 of FIG. 1. APU 200 includes generally a central processing unit (CPU) core complex 210, a graphics core 220, a set of display engines 230, a memory management hub 240, a data fabric 250, a set of peripheral controllers 260, a set of peripheral bus controllers 270, a system management unit (SMU) 280, and a set of memory controllers 290 (memory controller 292 and memory controller 294).

CPU core complex 210 includes a CPU core 212 and a CPU core 214. In this example, CPU core complex 210 includes two CPU cores, but in other embodiments CPU core complex can include an arbitrary number of CPU cores. Each of CPU cores 212 and 214 is bidirectionally connected to a system management network (SMN), which forms a control fabric, and to data fabric 250, and is capable of providing memory access requests to data fabric 250. Each of CPU cores 212 and 214 may be unitary cores, or may further be a core complex with two or more unitary cores sharing certain resources such as caches.

Graphics core 220 is a high performance graphics processing unit (GPU) capable of performing graphics operations such as vertex processing, fragment processing, shading, texture blending, and the like in a highly integrated and parallel fashion. Graphics core 220 is bidirectionally connected to the SMN and to data fabric 250, and is capable of providing memory access requests to data fabric 250. In this regard, APU 200 may either support a unified memory architecture in which CPU core complex 210 and graphics core 220 share the same memory space, or a memory architecture in which CPU core complex 210 and graphics core 220 share a portion of the memory space, while graphics core 220 also uses a private graphics memory not accessible by CPU core complex 210.

Display engines 230 render and rasterize objects generated by graphics core 220 for display on a monitor. Graphics core 220 and display engines 230 are bidirectionally connected to a common memory management hub 240 for uniform translation into appropriate addresses in memory system 120, and memory management hub 240 is bidirectionally connected to data fabric 250 for generating such memory accesses and receiving read data returned from the memory system.

Data fabric 250 includes a crossbar switch for routing memory access requests and memory responses between any memory accessing agent and memory controllers 290 (memory controller 292 and memory controller 294). It also includes a system memory map, defined by BIOS, for determining destinations of memory accesses based on the system configuration, as well as buffers for each virtual connection.

Peripheral controllers 260 include a USB controller 262 and a SATA interface controller 264, each of which is bidirectionally connected to a system hub 266 and to the SMN bus. These two controllers are merely exemplary of peripheral controllers that may be used in APU 200.

Peripheral bus controllers 270 include a system controller or "Southbridge" (SB) 272 and a PCIe controller 274, each of which is bidirectionally connected to an input/output (I/O) hub 276 and to the SMN bus. I/O hub 276 is also bidirectionally connected to system hub 266 and to data fabric 250. Thus for example a CPU core can program registers in USB controller 262, SATA interface controller 264, SB 272, or PCIe controller 274 through accesses that data fabric 250 routes through I/O hub 276.

SMU 280 is a local controller that controls the operation of the resources on APU 200 and synchronizes communication among them. SMU 280 manages power-up sequencing of the various processors on APU 200 and controls multiple off-chip devices via reset, enable and other signals. SMU 280 includes one or more clock sources not shown in FIG. 2, such as a phase locked loop (PLL), to provide clock signals for each of the components of APU 200. SMU 280 also manages power for the various processors and other functional blocks, and may receive measured power consumption values from CPU cores 212 and 214 and graphics core 220 to determine appropriate power states.

APU 200 also implements various system monitoring and power saving functions. In particular one system monitoring function is thermal monitoring. For example, if APU 200 becomes hot, then SMU 280 can reduce the frequency and voltage of CPU cores 212 and 214 and/or graphics core 220. If APU 200 becomes too hot, then it can be shut down entirely. Thermal events can also be received from external sensors by SMU 280 via the SMN bus, and SMU 280 can reduce the clock frequency and/or power supply voltage in response.

Figure 3:
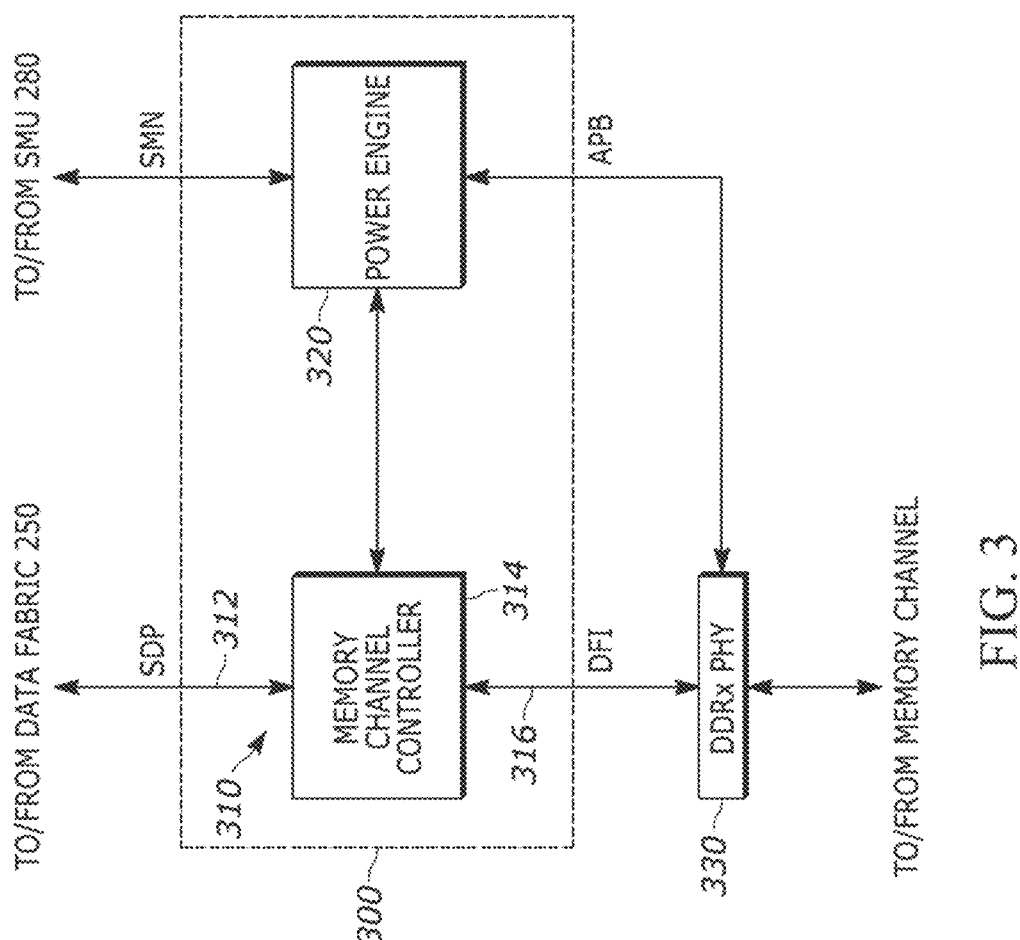
FIG. 3 illustrates in block diagram of a memory controller and associated physical interface (PHY) suitable for use in the APU of FIG. 2 according to some embodiments.

FIG. 3 illustrates in block diagram form a memory controller 300 and an associated physical interface (PHY) 330 suitable for use in APU 200 of FIG. 2 according to some embodiments. Memory controller 300 includes a memory channel 310 and a power engine 320. Memory channel 310 includes a host interface 312, a memory channel controller 314, and a physical interface 316. Host interface 312 bidirectionally connects memory channel controller 314 to data fabric 250 over a scalable data port (SDP). Physical interface 316 bidirectionally connects memory channel controller 314 to PHY 330 over a bus that conforms to the DDR-PHY Interface Specification (DFI). Power engine 320 is bidirectionally connected to SMU 280 over the SMN bus, to PHY 330 over the Advanced Peripheral Bus (APB), and is also bidirectionally connected to memory channel controller 314. PHY 330 has a bidirectional connection to a memory channel such as memory channel 130 or memory channel 140 of FIG. 1. Memory controller 300 is an instantiation of a memory controller for a single memory channel using a single memory channel controller 314, and has a power engine 320 to control operation of memory channel controller 314 in a manner that will be described further below.

Figure 4:
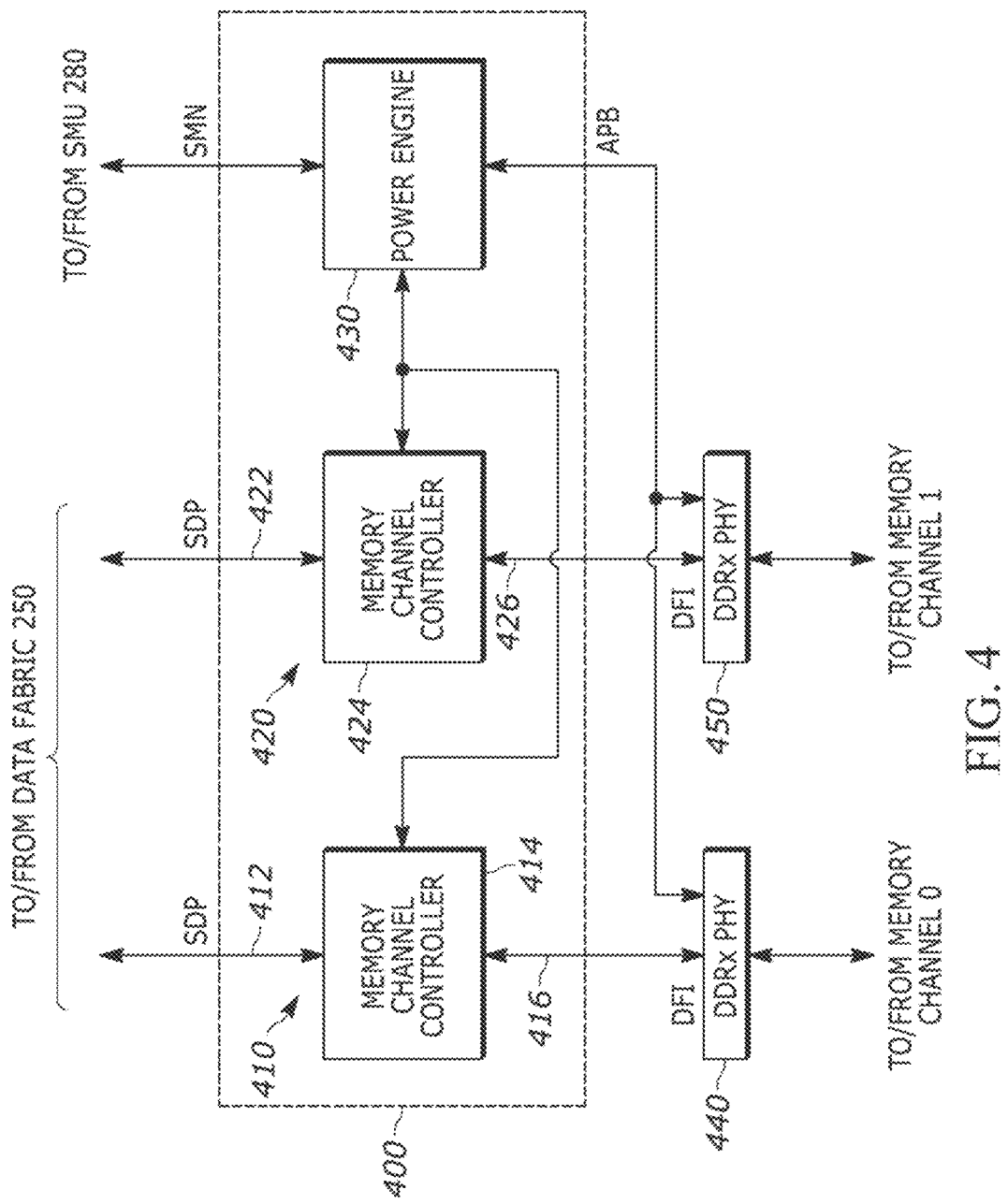
FIG. 4 illustrates in block diagram of another memory controller and associated PHY suitable for use in the APU of FIG. 2 according to some embodiments.

FIG. 4 illustrates in block diagram form another memory controller 400 and associated PHYs 440 and 450 suitable for use in APU 200 of FIG. 2 according to some embodiments. Memory controller 400 includes memory channels 410 and 420 and a power engine 430. Memory channel 410 includes a host interface 412, a memory channel controller 414, and a physical interface 416. Host interface 412 bidirectionally connects memory channel controller 414 to data fabric 250 over an SDP. Physical interface 416 bidirectionally connects memory channel controller 414 to PHY 440, and conforms to the DFI Specification. Memory channel 420 includes a host interface 422, a memory channel controller 424, and a physical interface 426. Host interface 422 bidirectionally connects memory channel controller 424 to data fabric 250 over another SDP. Physical interface 426 bidirectionally connects memory channel controller 424 to PHY 450, and conforms to the DFI Specification. Power engine 430 is bidirectionally connected to SMU 280 over the SMN bus, to PHYs 440 and 450 over the APB, and is also bidirectionally connected to memory channel controllers 414 and 424. PHY 440 has a bidirectional connection to a memory channel such as memory channel 130 of FIG. 1. PHY 450 has a bidirectional connection to a memory channel such as memory channel 140 of FIG. 1. Memory controller 400 is an instantiation of a memory controller having two memory channel controllers and uses the power engine 430 to control operation of both memory channel controller 414 and memory channel controller 424 in a manner that will be described further below.

Figure 5:
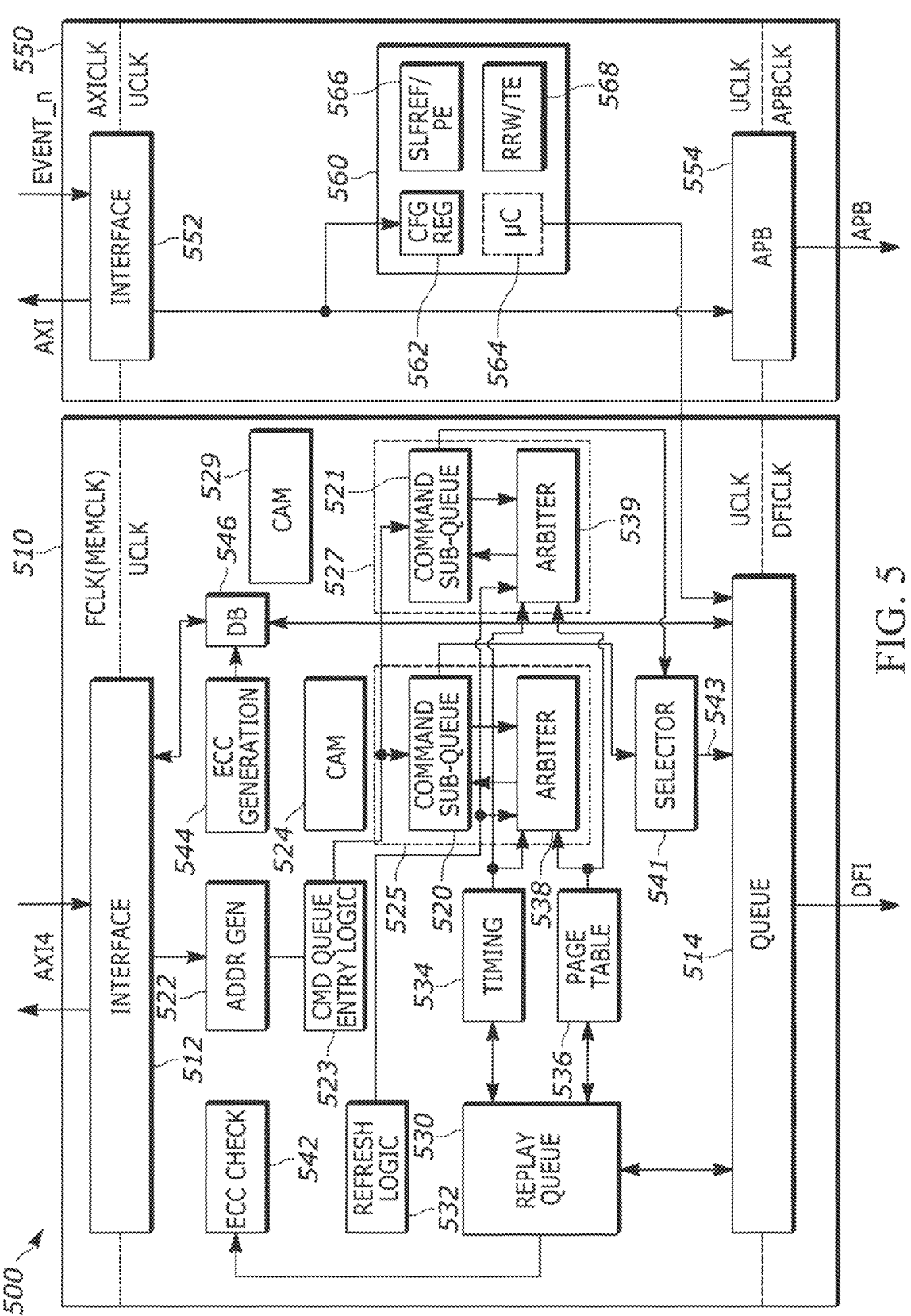
FIG. 5 illustrates a block diagram of a memory controller according to some embodiments.

FIG. 5 illustrates a non-limiting example of a block diagram of a memory controller 500 according to some embodiments. Memory controller 500 includes generally a memory channel controller 510 and a power controller 550. Memory channel controller 510 includes generally an interface 512, a queue 514, a first command sub-queue 520, an address generator 522, a content addressable memory (CAM) 524 and 529 for each respective command sub-queue/arbiter pair, a replay queue 530, a refresh logic block 532, a timing block 534, a page table 536, a corresponding arbiter 538, an error correction code (ECC) check block 542, an ECC generation block 544, and a data buffer (DB) 546. In some implementations, the memory controller 500 further includes a second command sub-queue 521, corresponding arbiter 539 and a selector 541 as further described below. Each command sub-queue 525 and 527 includes a corresponding arbiter and is also referred to herein as a sub-queue/arbiter pair, or command sub-queue/arbiter group or command sub-queue/arbiter module. Command sub-queue/arbiter modules 525 and 527 in some implementations are replicated to allow depth expansion as need for a given architecture and the second level of arbitration via selector 541 is configured to process additional outputs from the expanded number of modules. In certain implementations, the command queue entry logic 523 places (e.g., sorts and/or transfers between sub-queues) memory access requests into differing command sub-queues. In some examples this includes storing only read requests in one command sub-queue and storing only write requests in another command sub-queue. In other implementations the command queue entry logic 523 combines both read and write requests into the same command sub-queue. In certain implementations the command queue entry logic 523 moves entries from one command sub-queue to another.

In some implementations, each command sub-queue 520 and 521 stores 32 entries so the combined number of entries from both command sub-queues is 64 entries. However, any suitable number of command sub-queues and command sub-queue entry sizes may be employed. In some implementations, the functions in the various blocks can be combined with other blocks as desired. In some implementations the command queue entry logic 523, is embedded as part of the address generator or combined with other blocks. In one example, the command queue entry logic is implemented as one or more state machines. However, any suitable logic may be employed. In some implementations, the command queue entry logic 523 provides sub-queue control such that in-order memory access requests are used and allows one sub-queue to push entries to another sub-queue. For example, the command queue entry logic 523 includes the feedback structure from one sub-queue to another that indicates that an entry can be transferred and the structure to place the entry into the other command sub-queue.

Interface 512 has a first bidirectional connection to data fabric 250 over an external bus, and has an output. In memory controller 500, this external bus is compatible with the advanced extensible interface version four specified by ARM Holdings, PLC of Cambridge, England, known as "AXI4", but can be other types of interfaces in other embodiments. Interface 512 translates memory access requests from a first clock domain known as the FCLK (or MEMCLK) domain to a second clock domain internal to memory controller 500 known as the UCLK domain. Similarly, queue 514 provides memory accesses from the UCLK domain to the DFICLK domain associated with the DFI interface.

Address generator 522 decodes addresses of memory access requests received from data fabric 250 over the AXI4 bus. The memory access requests include access addresses in the physical address space represented in a normalized format. Address generator 522 converts the normalized addresses into a format that can be used to address the actual memory devices in memory system 120, as well as to efficiently schedule related accesses. This format includes a region identifier that associates the memory access request with a particular rank, a row address, a column address, a bank address, and a bank group. On startup, the system BIOS queries the memory devices in memory system 120 to determine their size and configuration, and programs a set of configuration registers associated with address generator 522. Address generator 522 uses the configuration stored in the configuration registers to translate the normalized addresses into the appropriate format. Command sub-queue 520 and command sub-queue 521 are each queues of memory access requests received from the memory accessing agents in data processing system 100, such as CPU cores 212 and 214 and graphics core 220 as provided by the command queue entry logic 523. Command sub-queue 520 stores the address fields decoded by address generator 522 as well other address information that allows arbiter 538 to select memory accesses efficiently, including access type and quality of service (QOS) identifiers. Likewise, command sub-queue 521 stores the address fields decoded by address generator 522 as well other address information that allows corresponding arbiter 539 to select memory accesses efficiently, including access type and quality of service (QoS) identifiers. CAM 524 and CAM 529 each include information to enforce ordering rules, such as write after write (WAW) and read after write (RAW) ordering rules.

Replay queue 530 is a temporary queue for storing memory accesses picked by arbiter 538 and arbiter 539 that are awaiting responses, such as address and command parity responses, write cyclic redundancy check (CRC) responses for DDR4 DRAM or write and read CRC responses for GDDR5 DRAM. In some implementation, for each command queue/arbiter pair, replay queue 530 accesses ECC check block 542 to determine whether the returned ECC is correct or indicates an error. Replay queue 530 allows the accesses to be replayed in the case of a parity or CRC error of one of these cycles. In other implementations, the replay mechanisms are instantiated for each command sub-queue/ arbiter pair.

Refresh logic 532 includes state machines for various power down, refresh, and termination resistance (ZQ) calibration cycles that are generated separately from normal read and write memory access requests received from memory accessing agents. For example, if a memory rank is in pre-charge power down, it must be periodically awakened to run refresh cycles. Refresh logic 532 generates refresh commands periodically to prevent data errors caused by leaking of charge off storage capacitors of memory cells in DRAM chips. In addition, refresh logic 532 periodically calibrates ZQ to prevent mismatch in on-die termination resistance due to thermal changes in the system. Refresh logic 532 also decides when to put DRAM devices in different power down modes.

Arbiter 538 is bidirectionally connected to command sub-queue 520 and arbiter 539 is bidirectionally connected to command sub-queue 521. Each arbiter improves efficiency by intelligent scheduling of accesses from a smaller command queue compared to prior systems, to improve the usage of the memory bus. Each arbiter 538 and arbiter 539 uses timing block 534 to enforce proper timing relationships by determining whether certain accesses in command sub-queue 520 and/or command sub-queue 521 are eligible for issuance based on DRAM timing parameters. For example, each DRAM has a minimum specified time between activate commands to the same bank, known as "$t_{RC}$". Timing block 534 maintains a set of counters that determine eligibility based on this and other timing parameters specified in the JEDEC specification, and is bidirectionally connected to replay queue 530. For example, each DRAM has a minimum specified time between an activate command (or row command) and a column command, known as "$t_{RCD}$". Arbiter 538 and arbiter 539 use counters in timing block 534 to determine eligibility of each CMD. Page table 536 maintains state information about active pages in each bank and rank of the memory channel for arbiter 538 and arbiter 539, and is bidirectionally connected to replay queue 530.

In response to write memory access requests received from interface 512, ECC generation block 544 computes an ECC according to the write data. DB 546 stores the write data and ECC for received memory access requests. It outputs the combined write data/ECC to queue 514 when selector 541 picks the corresponding write access from either of the command sub-queue 520 or command sub-queue 521 based on the command selected by each respective arbiter 538 or arbiter 539 for dispatch to the memory channel as further described below.

Power controller 550 generally includes an interface 552 to an advanced extensible interface, version one (AXI), an APB interface 554, and a power engine 560. Interface 552 has a first bidirectional connection to the SMN, which includes an input for receiving an event signal labeled "EVENT_n" shown separately in FIG. 5, and an output. APB interface 554 has an input connected to the output of interface 552, and an output for connection to a PHY over an APB. Power engine 560 has an input connected to the output of interface 552, and an output connected to an input of queue 514. Power engine 560 includes a set of configuration registers 562, a microcontroller ($\mu$C) 564, a self-refresh controller (SLFREF/PE) 566, and a reliable read/write training engine (RRW/TE) 568 (which in some implementations is implemented as a microcontroller). Configuration registers 562 are programmed over the AXI bus, and store configuration information to control the operation of various blocks in memory controller 500. Accordingly, configuration registers 562 have outputs connected to these blocks that are not shown in detail in FIG. 5. Self-refresh controller 566 is an engine that allows the manual generation of refreshes in addition to the automatic generation of refreshes by refresh logic 532. Reliable read/write training engine 568 provides a continuous memory access stream to memory or I/O devices for such purposes as DDR interface read latency training and loopback testing.

Memory channel controller 510 includes circuitry that allows it to pick memory accesses for dispatch to the associated memory channel. In order to make the desired arbitration decisions, address generator 522 decodes the address information into pre-decoded information including rank, row address, column address, bank address, and bank group in the memory system, and command sub-queue 520 and command sub-queue 521 store the pre-decoded information. Configuration registers 562 store configuration information to determine how address generator 522 decodes the received address information. For the entries in command sub-queue 520 arbiter 538 uses the decoded address information, timing eligibility information indicated by timing block 534, and active page information indicated by page table 536 to efficiently providing a "winning" memory access to the selector 541 while observing other criteria such as QoS requirements. For example, arbiter 538 implements a preference for accesses to open pages to avoid the overhead of pre-charge and activation commands required to change memory pages, and hides overhead accesses to one bank by interleaving them with read and write accesses to another bank. In particular during normal operation, arbiter 538 may decide to keep pages open in different banks until they are required to be pre-charged prior to selecting a different page. Arbiter 539 operates in the same manner as arbiter 538 and provides a "winning" memory access to the selector 541. The selector 541 selects a preferred memory access request 543 from among the provided memory access request from the first command sub-queue 520 and the memory access request from the command sub-queue 521. The selector 541 dispatches the preferred selected memory access request, so selected, to one of the plurality of memory channels according to the sub-channel. The selector 541, in one example, includes a multiplexor circuit. However, any suitable logic may be employed.

Address generator 522 sends the decoded memory access request including the decoded sub-channel number to command sub-queue 520 and sub-command queue 521. Command sub-queue 520 stores the decoded memory access request in an entry in command sub-queue 520, which has a first field for storing the decoded sub-channel number, and a second field for storing the remainder of the decoded memory access request as described above. Similarly, command sub-queue 521 stores the decoded memory access request in an entry in command sub-queue 521, which has a first field for storing the decoded sub-channel number, and a second field for storing the remainder of the decoded memory access request.

Arbiter 538 is bidirectionally connected to command sub-queue 520 and uses timing block 534 to enforce proper timing relationships by determining whether certain accesses in command sub-queue 520 are eligible for issuance based on DRAM timing parameters. Arbiter 538 picks eligible memory access requests from command sub-queue 520 according to the predetermined criteria that it uses. Similarly, arbiter 539 is bidirectionally connected to command sub-queue 521 and uses timing block 534 to enforce proper timing relationships by determining whether certain accesses in command sub-queue 521 are eligible for issuance based on DRAM timing parameters. Arbiter 538 picks eligible memory access requests from command sub-queue 521 according to the predetermined criteria that it uses. Examples of these predetermined criteria are described above and may vary between embodiments.

FIGS. 6-9 illustrate various non-limiting examples of command sub-queue and corresponding arbiter configurations. However, it will be recognized that these are but some examples and that other configurations are contemplated. Although not always shown, the arbiters as described herein (including those in FIG. 5) obtain priority information, PGT information, timing information and other information such as that needed to comply with the JEDEC specification, or any other suitable criteria.

Figure 6:
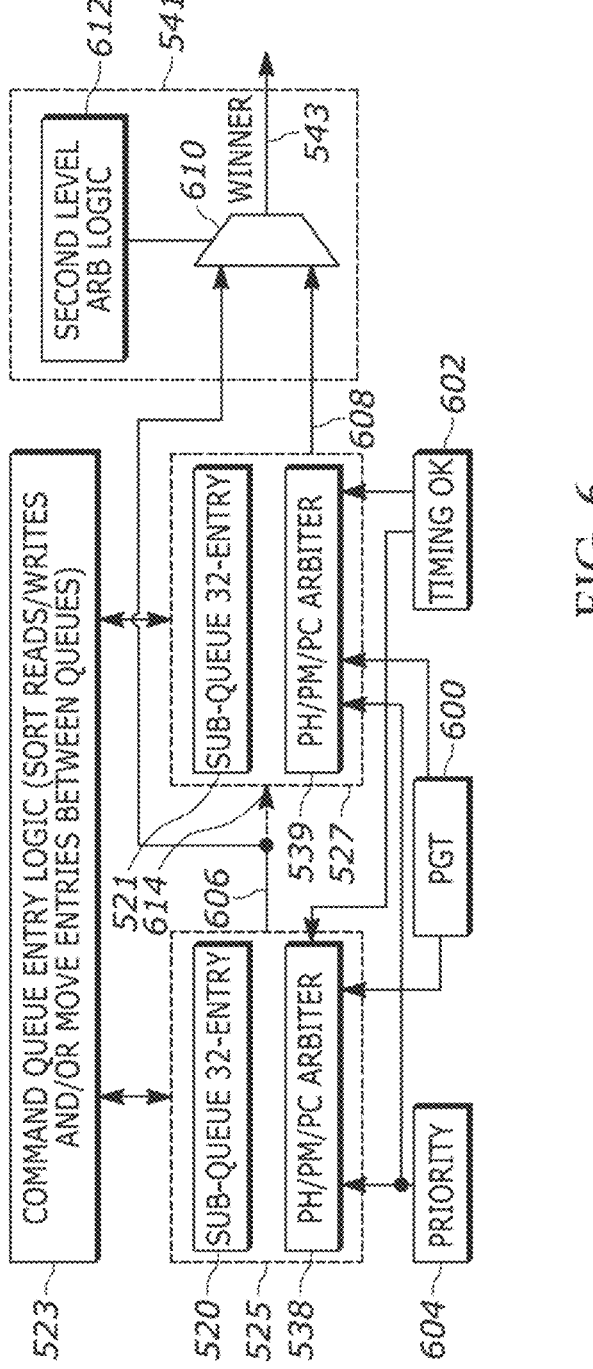
FIG. 6 illustrates a block diagram of a portion of a memory controller that employs a plurality of command sub-queues according to some embodiments.

FIG. 6 illustrates an example of a memory controller having a memory channel controller wherein the memory channel controller includes groups of command sub-queues and corresponding arbiters. The groups of command sub-queues and corresponding arbiters, shown as command sub-queue/arbiter modules 525 and 527. The corresponding arbiters select memory access commands from respective command sub-queues according to predetermined criteria, such as the criteria noted above. The command queue entry logic 523 is in communication with the command sub-queues and places memory access requests into the command sub-queue 520 and command sub-queue 527. In one example, the command queue entry logic 523 is implemented as one or more state machines. In some examples, the command queue entry logic includes programmable control registers that are programmed by a CPU or GPU and sets the command queue entry logic 523 to sort the memory access requests, such as read and write requests among the command sub-queues in a specific manner. In one example, the command queue entry logic 523 sorts read requests in one command sub-queue and write requests in a different command sub-queue. In other implementations, read and writes are mixed within a command sub-queue. In some implementations, the entries are transferred between command sub-queues. In some implementations, programmable control registers are also used to set thresholds for the various levels of arbitration as further noted below.

Each arbiter 538 and 539 in one example arbitrate based on JEDEC specification criteria and evaluate page table (PGT) information 600, timing information 602 and priority information 604 (e.g., low, medium, high, urgent) to select a winning memory access request 606 and 608 that is provided to the selector 541. For example, PGT information 600 represents whether a DRAM page is open (i.e. has been activated) or in the closed state (i.e. meaning it was pre-charged) and thus no page on a bank is opened. The timing information 602, in one example refers to Trc, Tred, etc. referred to above. The priority information 604 is the level of priority that the request comes in as—whether it be low, medium, high or urgent.

Page hit (PH) means that the page that is needed is already "ACTIVE" in the sense amplifier of the DRAM device and that line can be read or written directly. This is the lowest latency scenario. Page Miss (PM) means that the page needed is not open in the DRAM sense amplifier and thus it needs to be "ACTIVATED" then wait Tred until it becomes a page hit for access. This is the medium latency response. Page conflict (PC) means the page that is desired is not the current page open in that DRAM bank so the exiting page needs to be pre-charged—wait Trp—then the new pages needs to be ACTIVATED—wat Tred then it becomes a page hit and can be accessed.—this is the highest latency overhead.

The first level arbitration is performed by each of the arbiters 538 and 539 to select a winning entry to pass to the second level arbitration logic 612. For example, the arbiters 538 and 539 select a memory access command in each sub-queue meets specified criteria such as the command that has the highest priority based on the priority information 604 off all entries in a respective command sub-queue. The timing dependencies are resolved for the command as indicated by the timing information 602 (such as timing OK information) and there must also be a page table hit detected for the command and indicated by the page table information 600. If no commands meet this criteria, other criteria is used to select a winning command, such as the oldest command in the sub-queue or any other suitable criteria.

The selector 541 includes a multiplexor 610 and second level arbitration logic 612. The multiplexor 610 selects one of the winning memory access requests from one of the two command sub-queues based on criteria, such as timing thresholds and other criteria as determined by the second level arbitration logic 612. The second level arbitration logic 612 in one example, is implemented as one or more state machines however any suitable logic may be employed including programmed processors or any other suitable logic. As such, the second level arbitration logic 612, in this example, picks one winner amongst the winner of each instance of the command sub-queue and corresponding arbiter groups based on generated or prestored criteria such as timing information, page hit information and other information. For example, page hits are favored over page misses. In some implementations, if one of the winning memory access requests 606 or 608 is a page hit, that memory access request is selected as the preferred memory access request 543 if, for example, the other memory access request is for a memory access request that requires to activate and pre-charge a row of memory (e.g., a page miss). In some implementations, if both memory access requests have page hits, the second level arbitration logic 612 selects the memory access request with the highest priority. In some implementations, if both memory access requests 606 and 608 have page hits and both have the same level of priority, the second level arbitration logic 612 selects the older memory access request as the preferred memory access request. These are examples and it will be recognized that any suitable selection criteria may be employed.

In some implementations, the entries are transferred between command sub-queues as shown by dashed arrows such as arrow 614. In some implementations the command sub-queues are operated in an in-order manner such that the oldest entry is at an end of each sub-queue. The command queue entry logic 523 in this example provides feedback from one command sub-queue to the other letting the other know that an entry can be transferred to the command sub-queue having an open entry. In other implementations, out-of-order operation is provided.

Figure 7:
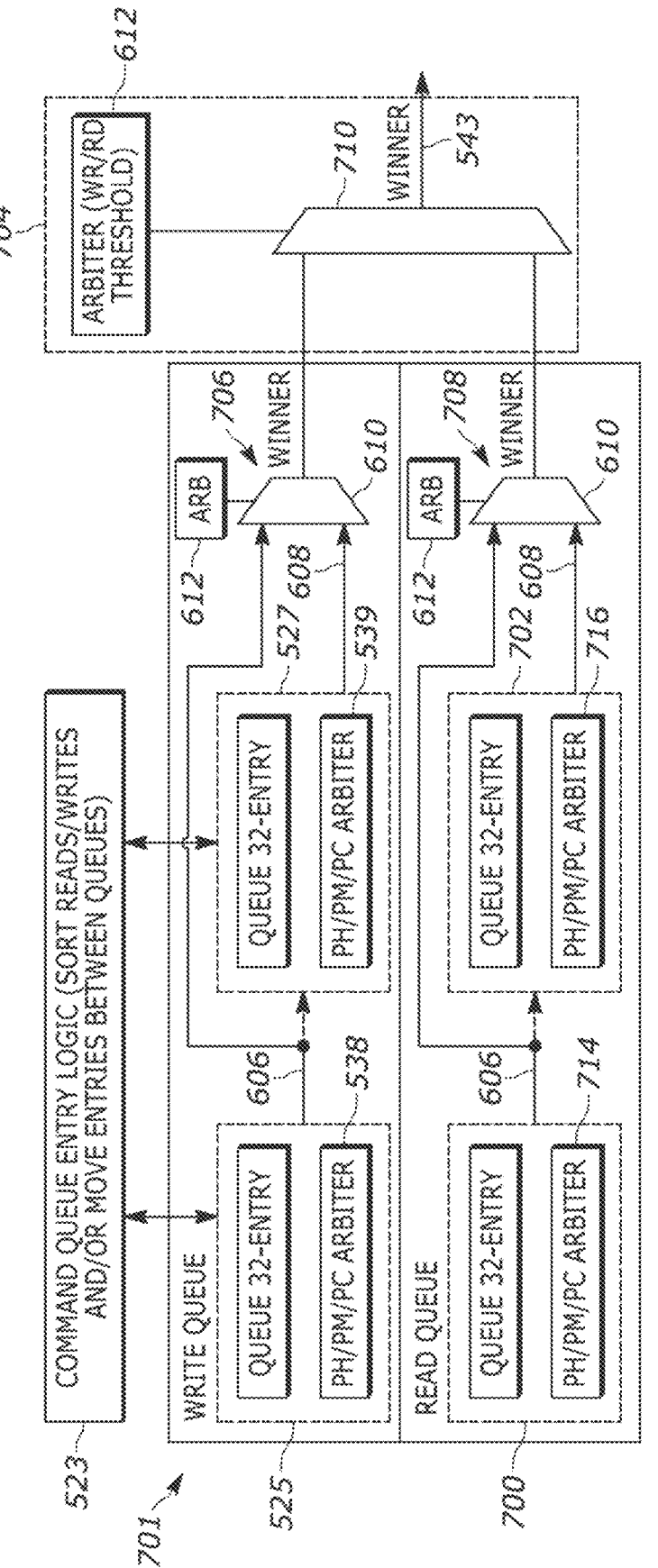
FIG. 7 illustrates a block diagram of another example of a memory controller employing separate write command sub-queues and separate read command sub-queues according to some embodiments.

FIG. 7 illustrates another example implementation 701 where multiple command sub-queue/arbiter modules 525 and 527 are configured as write sub-queues whereas additional command sub-queues 700 and 702 (e.g., command sub-queue/arbiter modules) are configured as read sub-queues. For example, implementation 701 employs dedicated write command sub-queues and dedicated read command sub-queues. The second level arbitration logic 612 in this example uses a criteria such as timing criteria to determine which write access request is selected and which read request is selected and output to a third selector 704 which in this example serves as the selector 541 in FIG. 1. As such, in this example, there are four command sub-queues and four corresponding arbiters, two second level arbiter logic sections, selectors 706 and 708, and a third selector 704. The selector 704 selects memory requests from either of the first selector 706 or selector 708 and sends the selected memory access request as the preferred selected memory access request to one or more sub-channels. In this example, selectors 706 and 708.

In this example, selector 704 uses a write threshold and read threshold stored in a control register to select whether a read request or a write request is selected as the preferred memory access request through multiplexor 710. In some implementations read requests are favored over write requests. The write threshold and read thresholds are set to avoid collisions on the data bus when switching the bus between read and write operations. For example, the read threshold is the number of consecutive reads to perform before the bus is switched to write operation and the write threshold is the number of consecutive writes that can occur before the bus is switched to perform read operations. Also in this example, the command queue entry logic 523 sorts memory access requests received from the address generator 522, into differing command sub-queues 525, 527, 700, 702, such that command sub-queue 525 only includes write requests and command sub-queue 700 only receives read requests. Similarly, the command queue entry logic 523 sorts memory access requests so that only write requests are stored in command sub-queue 527 and only read requests are stored in command sub-queue 702. In this example, arbiters 538 and 539 are configured to be the same type of arbiter that evaluates timing information related to write requests as well as other required information as noted above whereas arbiters 714 and 716 are configured to arbitrate for the purpose of read requests and take into account the timing information requisite to properly handle a memory access read request.

Figure 8:
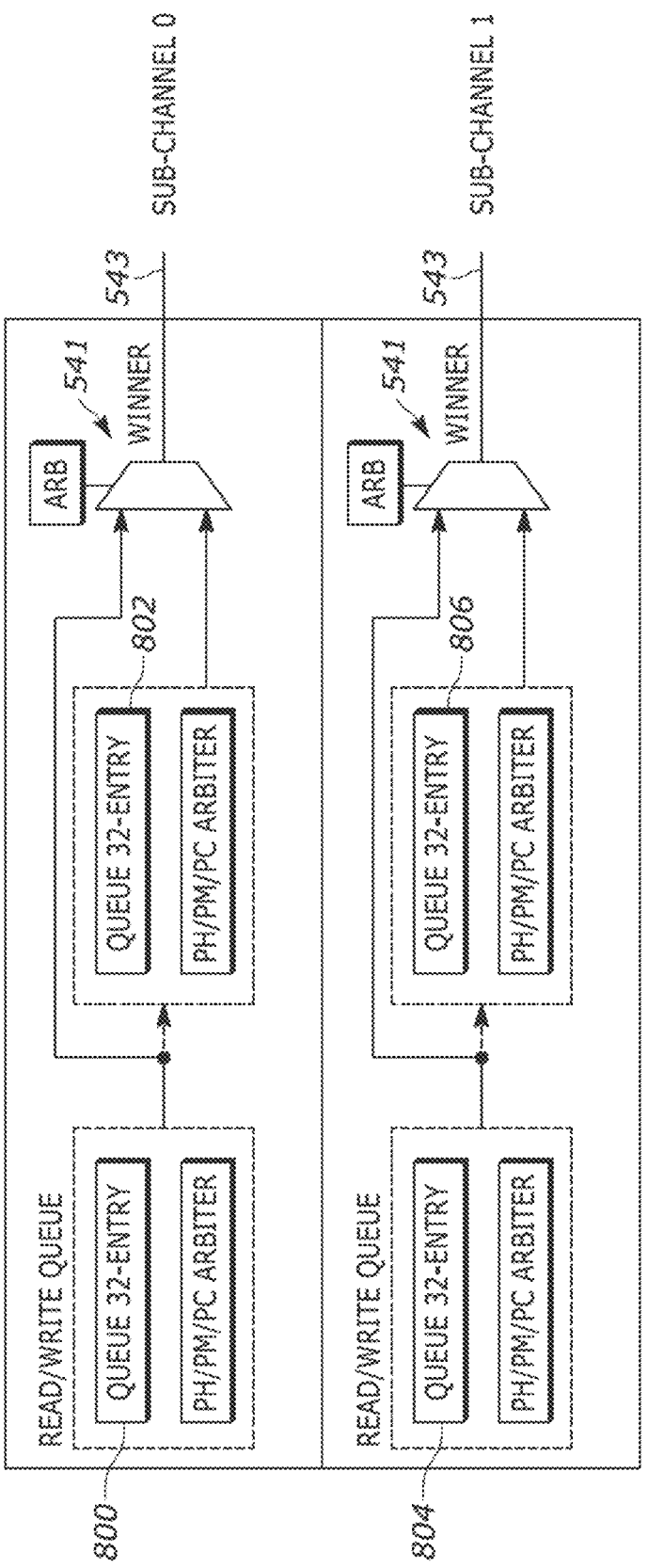
FIG. 8 is a block diagram illustrating another memory controller that employs differing groups of read/write sub-queues according to some embodiments.

FIG. 8 illustrates another example memory channel controller configuration wherein read and write queues are employed for each sub-channel such that each command sub-queues 800, 802 store both read and write memory access requests instead of only read or write memory access requests, and each of the command sub-queues 804 and 806 also store both read and write memory access requests.

Figure 9:
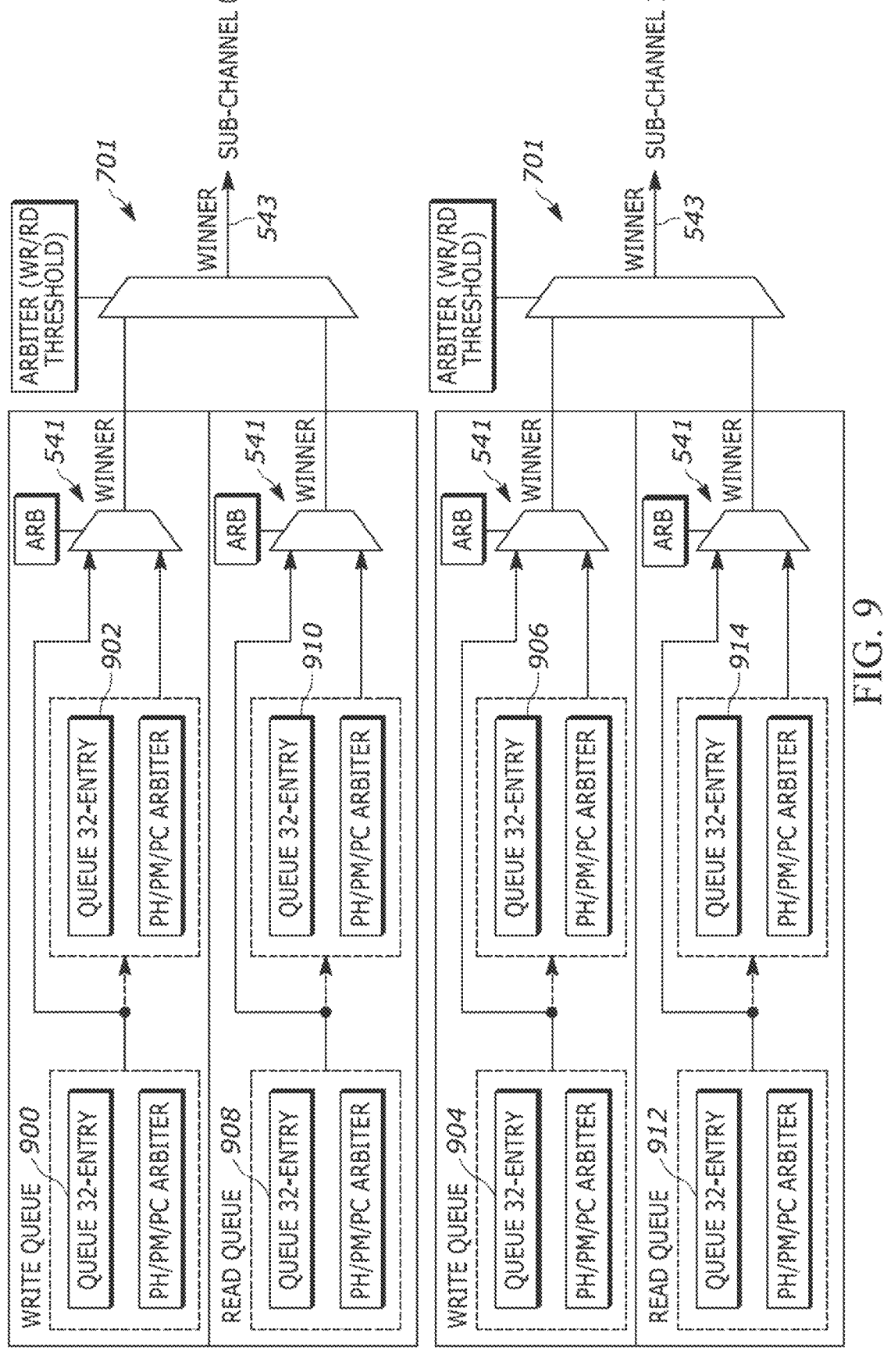
FIG. 9 illustrates a block diagram of another memory controller that employs multiple configurations of the memory controller architecture shown in FIG. 7.

FIG. 9 illustrates another example implementation that includes multiple instances of the structure shown in FIG. 7 dedicated to each sub-channel of memory. As such, in this example, there are dedicated read and write command sub-queues that are dedicated per sub-channel. For example, there are multiple command write sub-queues 900 and 902 for sub-channel 0 and write command sub-queues 904 and 906 for sub-channel 1. Likewise, there are multiple command read sub-queues 908 and 910 dedicated for sub-channel 0 and command write sub-queues 912 and 914 for sub-channel 1. Each of the command sub-queues has a corresponding dedicated arbiter as shown.

FIG. 10 illustrates an example method 1000 for controller a memory system having a plurality of memory channels. In certain implementations, the method is carried out by the structure illustrated in FIGS. 5-9. In certain implementations, the method includes receiving memory access requests 1002, such as by the address generator 522 and decoding, such as by the address generator 522, each of the memory access requests. In implementations where DDRx memory is employed, the method includes decoding the addresses into a bank, a rank, and a sub-channel of a plurality of sub-channels of memory devices in the memory system, as shown in block 1004. The method includes storing the decoded addresses on one of the plurality of command sub-queues. In implementations where DDRx memory is used, the method includes storing 1006, such as by the command queue entry logic 523 the memory access request including the bank, the rank, and the sub-channel in at least a first command sub-queue or at least second command sub-queue. Operations 1004 and 1006 need not be performed where memory that does not use bank and rank designations is used. In certain implementations storing includes sorting memory access requests into differing command sub-queues such that the first command sub-queue comprises only read requests and the second command sub-queue includes only write requests however, other sorting criteria is used in other implementations. In some implementations storing includes transferring entries between command sub-queues. The method includes selecting 1008 from among a plurality of memory access requests in the first command sub-queue using predetermined criteria, such as by the arbiter 538, to provide a selected first memory access request from the first command sub-queue and selecting 1010 from among a plurality of memory access requests in the second command sub-queue using predetermined criteria, such as by the arbiter 539, to provide a selected second memory access request from the second command sub-queue. The method includes selecting 1012 a preferred memory access request, such as by the selector 54,1 from among the provided first memory access request from the first command sub-queue and the second memory access request from the second command sub-queue, and dispatching 1014 the preferred selected memory access request, so selected, to one of the plurality of memory channels according to the sub-channel. It will be recognized that the method provided herein is but one example and that the operations may be combined, their order may be changed and other variations can be made depending on a desired operation.

One or more implementations utilize dedicated command sub-queues and corresponding arbiters which are smaller than a conventional command queue. For example, multiple 32 entry command queues and corresponding arbiters dedicated to servicing each of the smaller command queues are employed in some implementations herein instead of a larger 64 entry command queue. The arbitration and timing decisions are made in a much faster manner (e.g., a higher clock frequency is used) and improve memory controller speed of operation and improve data throughput of the integrated circuit containing the memory controller.

Memory controller 500 of FIG. 5 may be implemented with various combinations of hardware and software. This hardware circuitry may include priority encoders, finite state machines, programmable logic arrays (PLAs), and the like.

In some embodiments, other functional blocks can be performed by a data processor under the control of software. Some of the software components may be stored in a computer readable storage medium for execution by at least one processor, and may correspond to instructions stored in a non-transitory computer memory or computer readable storage medium. In various embodiments, the non-transitory computer readable storage medium includes a magnetic or optical disk storage device, solid-state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Memory controller 500 of FIG. 5 or any portions thereof may be described or represented by a computer accessible data structure in the form of a database or other data structure which can be read by a program and used, directly or indirectly, to fabricate integrated circuits. For example, this data structure may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist includes a set of gates that also represent the functionality of the hardware comprising integrated circuits. The netlist may then be placed and routed to produce a data set describing geometric shapes to be applied to masks. The masks may then be used in various semiconductor fabrication steps to produce the integrated circuits. Alternatively, the database on the computer accessible storage medium may be the netlist (with or without the synthesis library) or the data set, as desired, or Graphic Data System (GDS) II data.

While particular embodiments have been described, various modifications to these embodiments will be apparent to those skilled in the art. For example, memory controller 500 may interface to other types of memory besides DDRx memory, such as high bandwidth memory (HBM), RAMbus DRAM (RDRAM), and the like as well as different types of DIMMs. The memory controller can be integrated in network controllers, hard drive controllers and other devices. While the illustrated embodiment described memory addressing and control signals useful in DDR memory, they will vary depending on the type of memory used. Moreover memory access control of FIG. 6 can be scaled to more than two virtual channels.

Accordingly, it is intended by the appended claims to cover all modifications of the disclosed embodiments that fall within the scope of the disclosed embodiments.

Although features and elements are described above in particular combinations, each feature or element can be used alone without the other features and elements or in various combinations with or without other features and elements. The apparatus described herein in some implementations are manufactured by using a computer program, software, or firmware incorporated in a non-transitory computer-readable storage medium for execution by a general-purpose computer or a processor. Examples of computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

In the preceding detailed description of the various embodiments, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized, and that logical, mechanical and electrical changes may be made without departing from the scope of the invention. To avoid detail not necessary to enable those skilled in the art to practice the invention, the description may omit certain information known to those skilled in the art. Furthermore, many other varied embodiments that incorporate the teachings of the disclosure may be easily constructed by those skilled in the art. Accordingly, the present invention is not intended to be limited to the specific form set forth herein, but on the contrary, it is intended to cover such alternatives, modifications, and equivalents, as can be reasonably included within the scope of the invention. The preceding detailed description is, therefore, not to be taken in a limiting sense, and the scope of the present invention is defined only by the appended claims. The above detailed description of the embodiments and the examples described therein have been presented for the purposes of illustration and description only and not by limitation. For example, the operations described are done in any suitable order or manner. It is therefore contemplated that the present invention covers any and all modifications, variations or equivalents that fall within the scope of the basic underlying principles disclosed above and claimed herein.

The above detailed description and the examples described therein have been presented for the purposes of illustration and description only and not for limitation.

What is claimed is:

1. A method for controlling a memory system having a plurality of memory channels, comprising:
   placing memory access commands into a plurality of command sub-queues of at least one of: a write command sub-queue and a read command sub-queue;
   transferring memory access commands between the plurality of command sub-queues;
   arbitrating among memory access commands between each of the plurality of command sub-queues; and
   dispatching a selected memory access command from among the arbitrated commands from the plurality of command sub-queues to at least one of: a memory channel or a sub-channel.

2. The method of claim 1 wherein arbitrating among read commands comprises:
   selecting a first memory access command from among a first plurality of memory access commands in a first read command sub-queue;
   selecting a second memory access command from among a second plurality of memory access commands in a second read command sub-queue; and
   wherein the dispatched selected memory access command is a selected one of the first or second memory access commands.

3. The method of claim 2 comprising:
   arbitrating among read commands between each of the first and second read command sub-queues and among write commands in a first and a second write command sub-queue; and
   dispatching a selected memory access command from among the arbitrated read and write commands.

4. The method of claim 2 comprising:
   decoding each of the memory access commands into a bank, a rank, and a sub-channel of a plurality of sub-channels of memory devices in the memory system; and
   storing the memory access command including the bank, the rank, and the sub-channel in the plurality of command sub-queues.

5. The method of claim 2 wherein selecting the memory access command in each of the first and second read command sub-queues comprises using predetermined selection criteria.

6. The method of claim 2 comprising selecting a preferred memory access command by selecting an oldest memory access command from among an oldest memory request in the first read command sub-queue and the oldest memory request in the second read command sub-queue.

7. A memory controller comprising:
   command queue entry circuitry, operative to place memory access commands into a first command sub-queue and a second command sub-queue of at least one of: a write command queue and a read command queue and configured to transfer entries from the first command sub-queue to the second command sub-queue,
   a first arbiter coupled to the first command sub-queue to select memory access commands from the first command sub-queue,
   a second arbiter coupled to the second command sub-queue to select memory access commands from the second command sub-queue, and
   a first selector, operatively coupled to both the first and second arbiters, and operative to select memory access commands from either of the first command sub-queue or the second command sub-queue and send selected memory access commands to at least one of a: sub-channel or a channel.

8. The memory controller of claim 7 wherein the command queue entry circuitry is operatively coupled to place memory access commands into a first read command sub-queue, a second read command sub-queue, a first write command sub-queue and a second write command sub-queue.

9. The memory controller of claim 7 comprising shared timing logic and a shared page table that is shared between the first arbiter and the second arbiter.

10. The memory controller of claim 7 comprising:
   a third command sub-queue for storing memory access commands and a corresponding third arbiter coupled to the third command sub-queue to select memory access commands from the third command sub-queue according to predetermined criteria,
   at least a fourth command sub-queue for storing memory access commands and a corresponding fourth arbiter coupled to the fourth command sub-queue to select memory access commands from the fourth command sub-queue according to predetermined criteria, and
   a second selector coupled to both the third and fourth arbiters operative to select memory requests from either of the third command sub-queue or the fourth command sub-queue and send selected memory access commands to a corresponding sub-channel.

11. The memory controller of claim 7 wherein the command queue entry circuitry is operative to store memory access commands that comprise a bank, a rank, and a sub-channel of a plurality of sub-channels of memory devices in a memory system, into the first and second command sub-queues.

12. The memory controller of claim 7 wherein each of the first and second arbiter implements a preference for accesses to open pages by keeping pages open in different memory banks until a page is required to be pre-charged prior to selecting a different page.

13. A data processing system comprising:

a plurality of memory accessing agents for providing memory access commands;

a plurality of memory channels;

a memory controller comprising:

command queue entry circuitry operative to place memory access commands into a first command sub-queue and a second command sub-queue of at least one of: a write command queue and a read command queue and is configured to transfer entries from the first command sub-queue to the second command sub-queue;

a first arbiter operatively coupled to the first command sub-queue to select memory access commands from the first command sub-queue, a second arbiter operatively coupled to the second command sub-queue to select memory access commands from the second command sub-queue, and a first selector configured to select memory access commands from either of the first command sub-queue or the second command sub-queue and send selected memory access commands to at least one of: a sub-channel or a channel of the plurality of memory channels.

14. The data processing system of claim 13 wherein the command queue entry circuitry is operative to place memory access commands into a third command sub-queue and the memory controller comprising:

a corresponding third arbiter coupled to the third command sub-queue to select memory access commands from the third command sub-queue according to pre-determined criteria, a fourth command sub-queue for storing memory access commands and a corresponding fourth arbiter coupled to the fourth command sub-queue to select memory access commands from the fourth command sub-queue according to predetermined criteria, a second selector coupled to both the third and fourth arbiters operative to select memory requests from either of the third command sub-queue or the fourth command sub-queue; and a third selector operatively coupled to the first and second selectors and operative to select memory requests from either of the first selector or the second selector and send selected memory access commands to at least one of a plurality of sub-channels.

15. The data processing system of claim 13 comprising shared timing logic and a shared page table that is shared between the first arbiter and the second arbiter.

16. The data processing system of claim 13 wherein the command queue entry circuitry is operative to store memory access commands that comprise a bank, a rank, and a sub-channel of a plurality of sub-channels of memory devices in a memory system, into the first and second command sub-queues.

17. The data processing system of claim 13 comprising memory configured as a shared memory space operatively coupled to the plurality of memory channels and wherein the plurality of memory accessing agents comprise at least a graphics core and a central processing core.

18. The data processing system of claim 13 wherein the command queue entry circuitry is operative to provide feedback from one command sub-queue to another that indicates that an entry can be transferred and place the entry into the other command sub-queue.

19. The data processing system of claim 13 wherein each of the first and second arbiter implements a preference for accesses to open pages by keeping pages open in different memory banks until a page is required to be pre-charged prior to selecting a different page.

20. The data processing system of claim 13 wherein the selector is operative to select a memory access command from the first and second arbiter with a highest priority in response to a memory access command in each respective command sub-queue being identified as having a page hit.

* * * * *